(12) United States Patent
Boukari

(10) Patent No.: US 11,603,220 B2
(45) Date of Patent: Mar. 14, 2023

(54) METHOD OF TREATING THE PIPES OF THE DRINKING WATER NETWORK OF AN AIRCRAFT, FOR CLEANING PURPOSES

(71) Applicant: PRODOSE SARL, Bessieres (FR)

(72) Inventor: Morou Boukari, Toulouse (FR)

(73) Assignee: PRODOSE SARL, Bessieres (FR)

( * ) Notice: Subject to any disclaimer, the term of this patent is extended or adjusted under 35 U.S.C. 154(b) by 240 days.

(21) Appl. No.: 15/026,769

(22) PCT Filed: Oct. 9, 2014

(86) PCT No.: PCT/FR2014/052564
§ 371 (c)(1),
(2) Date: Apr. 1, 2016

(87) PCT Pub. No.: WO2015/052443
PCT Pub. Date: Apr. 16, 2015

(65) Prior Publication Data
US 2016/0251090 A1    Sep. 1, 2016

(30) Foreign Application Priority Data

Oct. 10, 2013 (FR) ........................................ 1359846

(51) Int. Cl.
*B64F 5/30* (2017.01)
*B08B 9/032* (2006.01)
*E03B 7/00* (2006.01)
*B64D 11/02* (2006.01)

(52) U.S. Cl.
CPC .............. *B64F 5/30* (2017.01); *B08B 9/0321* (2013.01); *B64D 11/02* (2013.01); *E03B 7/006* (2013.01); *B08B 2203/007* (2013.01); *B08B 2209/024* (2013.01)

(58) Field of Classification Search
CPC ............ B08B 9/0321; B08B 2203/007; B08B 2209/024; B64D 11/02; B64F 5/0018; B64F 5/30; E03B 7/006
See application file for complete search history.

(56) References Cited

U.S. PATENT DOCUMENTS 2,259,644 A * 10/1941 Kling .................... B08B 9/0326
                                                                134/22.12
5,405,452 A *  4/1995 Anderson ............. B08B 9/0321
                                                                134/22.12
2006/0169645 A1 *  8/2006 Hsueh .................... C02F 1/4674
                                                                210/739
2011/0049187 A1    3/2011 Boekhoorn et al.
2014/0230845 A1 *  8/2014 Boukari .................... B08B 3/12
                                                                134/1

FOREIGN PATENT DOCUMENTS

| FR | 2975928 | A1 | | 12/2012 | |
|---|---|---|---|---|---|
| JP | 08157885 | A | * | 6/1996 | |
| WO | 2010142924 | A2 | | 12/2010 | |
| WO | WO 2010142924 | A2 | * | 12/2010 | ........... B08B 9/0323 |
| WO | WO-2010142924 | A2 | * | 12/2010 | ........... B08B 9/0323 |
| WO | WO 2012168645 | A1 | * | 12/2012 | ............. B08B 9/032 |
| WO | WO-2012168645 | A1 | * | 12/2012 | ............... B08B 3/12 |

OTHER PUBLICATIONS

Machine translation of WO2010/142924A2 dated Dec. 2010.*
Machine translation of WO2010/142924A2 dated Dec. 2010 (Year: 2010).*
Abstractor JP08-157885A dated 1996 (Year: 1996).*
FedEx Aircraft Maintenance Work Card dated Apr. 2011 ("FedEx Work Card") (provided as Exhibit A in Applicant's Affidavit dated Sep. 19, 2018) (Year: 2011).*
Simin Baharlou, Preliminary International Report on Patentability, PCT/FR2014/052564, International Bureau of the World Intellectual Property Organization, dated Apr. 12, 2016, 1-7.

* cited by examiner

*Primary Examiner* — Douglas Lee
(74) *Attorney, Agent, or Firm* — Nixon & Vanderhye

(57) ABSTRACT

The invention concerns a method of treating the pipes of the drinking water network of an aircraft for cleaning purposes, said network comprising at least one storage tank and a plurality of pipes providing a plurality of water inlet and outlet points, notable in that it involves the following operations: —injecting water at a high temperature of between fifty and one hundred degrees Celsius into the network, for treatment purposes, —draining, —injecting cold water at a temperature no higher than thirty degrees Celsius combined with chemical treatment products comprising a chlorinated product or hydrogen peroxide, —draining, —injecting water at a high temperature of between fifty and one hundred degrees Celsius for rinsing purposes, eliminating the chemical treatment products comprising a chlorinated product or hydrogen peroxide, —draining. Applications: cleaning the drinking water network of an aircraft.

2 Claims, No Drawings

METHOD OF TREATING THE PIPES OF THE DRINKING WATER NETWORK OF AN AIRCRAFT, FOR CLEANING PURPOSES

CROSS-REFERENCE TO RELATED APPLICATION

This application is a 371 national stage application of International Application PCT/FR2014/052564, filed Oct. 9, 2014, and claims the priority of French Application No. 1359846, filed on Oct. 10, 2013.

FIELD OF APPLICATION OF THE INVENTION

This invention relates to the field of aircraft and in particular adaptations making it possible to perform, under the best conditions, the treatment, for cleaning purposes, of pipes of a drinking water system in an aircraft.

DESCRIPTION OF THE PRIOR ART

Aircraft, and in particular those capable of holding passengers, are equipped with a drinking water distribution system (for consumption, hygiene, etc.), which includes at least one tank and a plurality of pipes making it possible to create inlet or outlet points available for passengers and/or operators.

Classically, the drinking water distributed in an aircraft is treated by means of different solutions:

chemical means (chlorine and derivatives, active oxygen, etc.)

filtration means (for example, carbon filter cartridge, ion exchange, etc.), etc.

Nevertheless, due in particular to the non-continuous use of distribution pipes, over the long term these different means do not prevent the deposition of impurities, biofilms and/or the appearance of bacteria on the interior walls of the pipes.

The aircraft must therefore regularly undergo an operation for treatment of its drinking water system for cleaning purposes, thus requiring it to be immobilized on the ground.

It is then particularly important that said operation requires as little time as possible.

Today, there are a number of methods making it possible to perform such a cleaning.

Thus, there are so-called chemical treatment methods that consist in a first phase of injecting, into the pipes, high-dose chemical products, then rinsing the pipes in multiple cold-water injection phases until water with the desired parameters is obtained.

Without describing it in detail, it has been noted that this method requires a large number of operations, therefore a particularly significant amount of time, in particular due to the need for rinsing. This rinsing phase, after chemical treatment, is particularly sensitive and requires many precautions to avoid any new contamination.

In spite of this, the water analyzed at the circuit outlet may, in some cases, have a level of contamination.

There are also other methods such as that described in document WO 2010/142924, which proposes a method for treating the drinking water system of an aircraft, a device and an aircraft enabling it to be implemented. The method proposed, according to one embodiment, circulating hot water inside the drinking water circuit while leaving the filter cartridges in place. In addition, document FR2975928 describes another dynamic method for cleaning water pipes of a vehicle and a device enabling it to be implemented. The method proposed creating a shock wave in the pipe to be cleaned. According to an embodiment, the water used for the shock wave was heated.

DESCRIPTION OF THE INVENTION

In view of the above, the applicant carried out research in order to propose a method for treating, for cleaning purposes, pipes of the drinking water system of an aircraft without the disadvantages of the methods of the prior art.

This research led to the development of a method for treating, for cleaning purposes, pipes of the drinking water system of an aircraft, which system includes at least one storage tank and a plurality of pipes offering a plurality of water inlet and outlet points. This method is particularly advantageous in that it includes the following operations:

injection of high-temperature water at between fifty and one hundred degrees Celsius into the system for cleaning purposes, draining, injection of cold water not exceeding thirty degrees Celsius, associated with chemical treatment products comprising a chlorinated product or hydrogen peroxide, draining, injection of high-temperature water at between fifty and one hundred degrees Celsius for rinsing by removing the chemical treatment products comprising a chlorinated product or hydrogen peroxide, draining.

This method has numerous advantages described below.

Thus, the first hot water injection has the effect of liquefying the organic or greasy matter that will then be removed, and of at least partially removing the bacteria.

The injection of chemical products comprising a chlorinated product or hydrogen peroxide makes it possible to disintegrate the biofilm that would have resisted the first hot water injection, in particular by chemically killing the bacteria. The first phase thus makes it possible to dissolve the greasy layer that the chemical product could not penetrate. The method thus makes it possible to associate hot water disinfection and chemical disinfection.

Finally, the rinsing with hot water ensures faster removal of the disinfectant products and an additional treatment. The second hot water injection has a rinsing function, i.e. removing the treatment products. The method thus proposes reproducing a same hot water injection phase for different main technical effects, namely, for the first phase, the treatment, and for the third phase, the rinsing of the treatment of the second phase.

In fact, the main technical effect of this new method lies in the reduction of the cleaning phase time, due, on the one hand, to the complementarity of the treatment methods between the hot water and the chemical products and, on the other hand, the short lifetime of the latter in a hotter environment. The chemical products used comprising a chlorinated product or hydrogen peroxide are easily removed in contact with hot rinsing water.

Thus, for example, while the rinsing with cold water required two to three passages of water through the pipes, the hot water rinsing enables this to be reduced to a single passage. The water is then not used primarily as a treatment means but as means for rinsing and removing previously injected disinfectant products.

Another technical effect of this method is the reduction of proportions of chemical products to be injected owing to a preliminary hot water treatment phase. This reduction contributes to the longest possible preservation of the characteristics of the pipes. According to a first observation, the implementation of the method of the invention shows a reduction by 2 to 10 times in the proportions used until now.

The series of three operations/injections makes it possible to use certain products. Thus, for example, owing to a preliminary hot water treatment, the hydrogen peroxide is used alone without an activator (such as silver salt).

In addition, this series makes it possible to create and use a heat shock in the pipes.

In addition, while the cold water rinsing phase following the injection of water with chemical product required significant precaution in order to prevent any new contamination, the use of hot water ensures protection against new contamination.

Thus, the method of the invention does not constitute a simple series of phases that may already be known, but requires their adaptation, their partial elimination, or their optimization thereof.

It thus appears that the method of the invention makes it possible to obtain results superior to those obtained by the methods of the prior art. It reduces costs in treatment products but also, especially, in the period for which the aircraft is immobilized on the ground. It finally enables the rinsing phase to be made more practical by eliminating certain precautions that have been necessary until now in order to prevent any recontamination.

The applicant has observed the reduction by half in the time necessary for the treatment, for cleaning purposes, of a drinking water system of an aircraft.

To promote the heat shock but also to save time, the method of the invention advantageously involves distinguishing/separating (and therefore controlling) the drainage of the tank(s) from that of the pipes.

Thus, if according to a feature, the method consists in starting the second and/or third injection once the tank and pipes have been drained, another feature of the method consists in starting the second and/or third injection once the single tank has been drained. The thermal contrasts are therefore more pronounced and the operations of filling the tank(s) may be performed at the same time.

The treatment method is applied to the drinking water system of an aircraft, the system being of the type comprising at least one storage tank, a plurality of pipes offering a plurality of water inlet and outlet points, consisting in:
  filling said tank by means of the treatment liquid,
  circulating said treatment liquid in the water.

When the aircraft is of the type in which the drinking water system includes filtration means comprising removable filter cartridges provided in certain pipes, said cartridges being arranged in bowls, forming, with the latter, the filtration means provided at water outlet points such as those used to supply the washing sink taps or those used for consumption in aircraft, filtration means through which the water must pass before reaching the tap. The method of the invention is remarkable in that said filtration cartridges are not removed during all of the operations.

Thus, the method consists in:
  not removing the filter cartridges,
  circulating the treatment liquid in the system with the cartridges installed.

The holding in place of the filtration means is easier to implement owing to the preliminary implementation of a hot water treatment phase and a hot water rinsing phase after the chemical treatment, which makes the method even faster.

According to another feature, said cartridges are removed during all of the operations.

According to another particularly advantageous feature of the invention, a dynamic cleaning phase is implemented before the injection of high-temperature water for treatment purposes.

This method consists in:
  creating a shock wave in the pipes to be cleaned, partially filling a volume with a liquid,
  filling the volume not occupied by the liquid with pressurized gas,
  releasing the liquid through a constricted area communicating with the end of said pipe(s) to be cleaned, the other end of which is open while the pressure is maintained, so as to:
  create an accelerated movement of the liquid in a first phase and of the gas and liquid mixture created in a second phase, then
  generating a shock wave, once the volume has been drained, which shock wave is propagated through the mixture.

According to another particularly advantageous feature, the method consists, during the first water injection phase, at high temperature for cleaning purposes, in creating a shock wave in the pipes to be cleaned,
  by partially filling the tank of the aircraft with high-temperature water, and
  filling the volume not occupied with water with pressurized gas,
  releasing the water through a constricted area communicating with the end of said pipe(s) to be cleaned, the other end of which is open while the pressure is maintained,
  so as to:
  create an accelerated movement of the water in a first phase and of the gas and liquid mixture created in a second phase, then
  generating a shock wave, once the volume has been drained, which shock wave is propagated through the mixture.

It is understood that the method, described above and illustrated, is done so for the purpose of disclosure rather than for the purpose of limitation. Of course, various arrangements, modifications and improvements may be made to the example above, without going beyond the scope of the invention.

The invention claimed is:

1. A method for treating, for cleaning purposes, pipes of a drinking water system of an aircraft,
  wherein the system comprises at least one storage tank and a plurality of pipes offering a plurality of water inlet and outlet points,
  the system further comprising a filtration means comprising removable filter cartridges provided in predetermined pipes, said cartridges being arranged in bowls formed with the predetermined pipes, the filtration means provided at water outlet points used to supply washing sink taps and/or at water outlet points used for consumption in aircraft, wherein the water must pass through the filtration means before reaching the water outlet points,
  the method comprising:
    removing the filtration cartridges during the whole of the operations;
    a first operation configured to liquefy a greasy layer of biofilms thereby exposing bacteria of the biofilms, the first operation comprising injection of high-temperature water at between fifty and one hundred degrees Celsius into the system for treatment purposes; the first operation comprising creating a shock wave in the pipes to be cleaned, the pipes having a respective first end and a respective second end, by i) partially filling the tank of the aircraft with high-temperature water, ii) filling the volume not occupied with water with pressurized gas, iii) releasing the water through a constricted area communicating with the first end of said pipe(s) to be cleaned, the second other end of which is open while the pressure is maintained, so as to create an accelerated movement of the water in a first phase and of the gas and liquid mixture created in a second phase, and then generating a shock wave, once the volume has been drained, which shock wave is propagated through the mixture draining the water of the first injection;

a second operation configured to kill bacteria exposed by the first operation and to disintegrate the biofilms, the second operation comprising injection of cold water not exceeding thirty degrees Celsius, associated with a chemical treatment product comprising a chlorinated product or hydrogen peroxide;

draining the water of the second injection;

a third operation configured to remove the chemical treatment product by rinsing, the third operation comprising a single injection of high-temperature water at between fifty and one hundred degrees Celsius;

draining the high-temperature water injected in the third operation;

wherein the chemical treatment product and the temperature of the high-temperature water of the third operation are configured to be complimentary such that the chemical treatment product is removed upon contact with the high-temperature water, wherein the single injection of the third operation is the only rinsing operation of the method for treating and is not followed by a second or additional rinsing step, and wherein the second and third operations are started once the tank and the pipes have been drained.

2. The method for treating according to claim 1, wherein the chemical treatment product consists of hydrogen peroxide used alone and without an activator.

* * * * *